(12) United States Patent
Hellweg et al.

(10) Patent No.: US 7,976,888 B2
(45) Date of Patent: Jul. 12, 2011

(54) METHODS FOR PREPARING OAT BRAN ENRICHED IN BETA-GLUCAN AND OAT PRODUCTS PREPARED THEREFROM

(75) Inventors: John H. Hellweg, Minnetonka, MN (US); John D. McKeehen, Lausanne (CH); Michael Dietsch, Blaine, MN (US)

(73) Assignee: General Mills IP Holdings II, LLC, Minneapolis, MN (US)

( * ) Notice: Subject to any disclaimer, the term of this patent is extended or adjusted under 35 U.S.C. 154(b) by 923 days.

(21) Appl. No.: 11/858,934

(22) Filed: Sep. 21, 2007

(65) Prior Publication Data
US 2009/0078802 A1   Mar. 26, 2009

(51) Int. Cl.
*A23L 1/164*   (2006.01)
(52) U.S. Cl. ........ 426/618; 426/478; 426/481; 426/615; 426/619; 426/620; 426/621
(58) Field of Classification Search .................. None
See application file for complete search history.

(56) References Cited

U.S. PATENT DOCUMENTS

| | | | |
|---|---|---|---|
| 4,777,045 A | 10/1988 | Vanderweer et al. | |
| 5,151,283 A | 9/1992 | Foehse | |
| 5,523,109 A | 6/1996 | Hellweg et al. | |
| 6,323,338 B1 | 11/2001 | Potter et al. | |
| 6,592,914 B1 | 7/2003 | Triantafyllou | |
| 6,797,307 B2 | 9/2004 | Malkki et al. | |
| 7,494,683 B2 * | 2/2009 | Hellweg et al. | 426/618 |
| 2003/0087019 A1 | 5/2003 | Malkki et al. | |
| 2003/0148015 A1 | 8/2003 | Cahill et al. | |
| 2005/0153044 A1 | 7/2005 | Hellweg et al. | |

OTHER PUBLICATIONS

K. Vorwerck, Braunschweig, Jan. 1, 1999, *Oat Grinding Products with Increased Dietary Fiber Content*, 6 pages.

* cited by examiner

*Primary Examiner* — Lien Tran
(74) *Attorney, Agent, or Firm* — John A. O'Toole; Everett G. Diedriks

(57) ABSTRACT

Dry milling methods for preparing oat products enriched in the content of β-glucan and methods for preparing foodstuffs incorporating such an enriched oat product especially ready-to-eat cereals are provided. Heat conditioned dehulled oats are dry milled to form a coarse whole non defatted oat flour and then, without a preceding removal of fat, dry fractionated into coarser bran and finer oat flour fractions at multiple stages. The coarse oat flour is first dry classified to separate or form a coarser fraction oat bran containing more concentrated β-glucan and a finer oat flour or starch containing or endosperm containing fraction. The oat bran is fractionated into a coarse and fine oat bran sub-streams. The oat bran sub-streams are each is subjected to second roller milling step and then bolted. The second bolting of oat bran is then subjected to a third round of milling and classification to form a high β-glucan content (>7-9%) oat bran and a low β-glucan content (3%) oat flour. The methods are low cost and commercially practical. Preferably, the high β-glucan content oat bran and oat flour fractions can have a syringic acid to ferulic acid ratio of at least 2.5:1 indicating improved flavor. Preferably, the oat bran and oat flour have a Farinograph value of 5 to 20 minutes indicated partial gelatinization. The oat bran and oat flours can be used to prepare foodstuffs such as ready-to-eat cereals.

24 Claims, 1 Drawing Sheet

METHODS FOR PREPARING OAT BRAN ENRICHED IN BETA-GLUCAN AND OAT PRODUCTS PREPARED THEREFROM

BACKGROUND OF THE INVENTION

The present invention relates to food product processing, such as the milling of oats to provide milled oat products such as oat bran and oat flour. More particularly, the present invention is directed towards an improved process for milling oats to provide for oat bran high in β-glucan and to β-glucan enriched whole grain oat flour comprising the enriched oat bran and to low fiber oat flour.

The present invention provides improvements upon the dry milling processing methods for oat groats disclosed in US 2005/0153044 "Methods for preparing Oat Bran Enriched In Beta Glucan and Oat Products Prepared Therefrom (published Jul. 14, 2005 by Hellweg et al.). The present methods differ first in the selection of the high flavor oat groats as the starting material. Second, the methods disclosed have been improved also in that the first bolting oat bran of the '044 application in the present methods is fractionated into a coarse and fine fractions; separately milled in different roll stands and then recombined before further processing as generally described in the '044 application. As a result of these changes, higher throughput rates are obtained. Also, a higher percentage of the valuable oat bran fraction is recovered in the high beta glucan oat flour fraction compared to that achievable in the '044 method.

Cereal grain seeds generally contain a small amount of beta-glucan, with oats and barley being recognized as the richest sources of this material. The naked oat seed, known in the art as a "groat", typically contains 2-4% by weight β-glucan, depending upon oat variety and other factors such as growing conditions. Barley seeds can typically contain twice as much beta-glucan as groats. Beta-glucan is generally found in higher concentrations in the outermost layers of the seed (i.e., the "bran"). Thus, oat bran contains generally a minimum of 5.5% by weight beta-glucan, and typically contains up to 6% up to less than 7% by weight beta-glucan.

The present invention resides in methods for preparing an oat bran having higher levels of β-glucan content, i.e., higher than about 7%.

Oatmeal and oat bran are popular hot cereal consumer products. Oat based Ready-To-Eat ("RTE") cereal or breakfast cereals are also popular consumer foods packaged food products. One popular line of oat based RTE cereal products is available in puffed "O" shaped pieces fabricated from a cooked cereal dough comprising whole grain oat flour. Other RTE oat-based products are available in the forms of flakes as well as in the form of biscuits or even other puffed shapes (e.g., numbers or letters).

Improvements in oat processing are known to provide oat flours of improved flavor and stability (see, for example, U.S. Pat. No. 5,523,109 "Oat Flour And Method Of Preparation" issued Jun. 4, 1996 to Hellweg, et al.). In the methods of '109 patent, whole oat groats are steamed for greater times than was then conventional, dry toasted for extended times and milled to provide the improved flavor conditioned oat flour. The improved oat flour can then be used to prepare puffed oat based RTE cereal products especially puffed "O" shaped products. However, the '109 patent does not teach or suggest fractionation of the oat flour so produced or that any benefit would be derived there from.

Such oat based products are popular not only for their taste and texture eating qualities but also because of the nutritional properties of the oats from which these products are prepared. In addition to high levels of protein provided by oats, are known as a good source of soluble fiber. A good description of the literature pertaining to the health discussion on the role of fiber is found in U.S. Pat. No. 4,777,045 (issued Oct. 11, 1988 to Vanderveer et al. and is entitled High Bran Snack) which is incorporated herein by reference.

There is a growing awareness of the health benefits to people associated with soluble fiber consumption, especially reductions in blood serum cholesterol, i.e., antillypercholesterolemic benefits. Total dietary fiber ("TDF") comprises both soluble dietary fiber ("SDF") and insoluble dietary fiber ("IDF"). In addition to insoluble fiber, oat and barley whole grain cereal flours contain soluble fiber that predominantly comprise β-glucans.

Thus, whole grain oat flour based RTE cereals are naturally and beneficially high in β-glucan fiber levels due to native 2-4% levels of β-glucan in whole grain oat flour. However, in certain crop years due to vagaries of growing conditions, the native levels of oat bran in whole grain oat flow can be too low to provide the requisite levels of soluble fiber to provide sufficient amounts of soluble fiber per serving of finished RTE cereal such as to characterize the RTE cereal as "heart-healthy". Also, for even better fiber nutrition, it would be desirable to fortify oat based RTE cereals with β-glucan.

One technique for increasing the soluble fiber content of whole grain oat flour and RTE products prepared therefrom is to fortify the whole grain oat flour with oat bran. Since β-glucan is higher in concentration in oat bran (5.5% to under 7%), the cereal products can be formulated with added levels of oat bran. However, as the concentration of oat bran increases in such products (beneficially increasing the β-glucan content) other properties such as cost increases and puffability correspondingly decrease. Also, while such products are known and are commercially available (such as from Can-Oat Milling, a wholly owned subsidiary of Saskatchewan Wheat Pool, Portage La Prairie, Manitoba, Canada R1N 3W1), such high β-glucan oat bran products are high in price and are produced by methods that are proprietary. Moreover, while such products are higher in β-glucan content, such products do not have the improved flavor profile of the oat flour products prepared by the methods of the Hellweg '109 patent. More recently, methods for producing oat products high in β-glucan have been described in published US patent application US 2003/0087019 A1 published May 8, 2003.

Barley also contains beta glucan. While most barley varieties are bred for low β-glucan content (since β-glucan is inimical to brewing clear beer), some barley varieties are high in β-glucan content. Dry milling methods for preparing a β-glucan rich material from barley are also known and for the provision of RTE cereals prepared there from (see for example, U.S. Pat. No. 5,151,283) "High Soluble Fiber Barley Expanded Cereal and method of Preparation" (issued Sep. 29, 1992 to Foehse et al.). However, the '283 patent teaches that due to the differences between barley and oats, teachings regarding processing of one grain are not transferable between oats and barley. Indeed, commercial milling operations are typically designed and operated to process single grain types. Also, when providing whole grain oat products especially popular puffed RTE products, addition of barley based ingredients can be seen undesirably diluting the oat identity of such products.

Wet extraction methods for preparing β-glucan from oat flours are known (see for example U.S. Pat. No. 6,323,338 "Method for concentrating B-glucan" issued Nov. 27, 2001 to Potter, et al.). The '338 patent teaches that "Previous processes for concentrating beta-glucan from cereals such as oats or barley have proven impractical for commercial manufacturing processes because of high cost and/or low yields." Notwithstanding described improvements, commercial wet extraction β-glucan methods remain uneconomical for mass produced consumer food products.

Thus, in view of the present state of the art, there is a continuing need for methods for preparing a high β-glucan content oat bran ingredient. There is also a continuing need for less expensive β-glucan extraction techniques compared to known wet extraction methods.

There is also a need for whole grain oat flours enriched with high levels of β-glucan that provide the taste and cook properties of known whole grain oat flours of lower oat bran and β-glucan contents.

There is also a continuing need for the methods of preparing high quality fine oat flour characterized by low levels of bran and beta glucan content for the preparation of oat based RTE cereals of high puffability and low density.

There is also a continuing need for simpler commercially practical methods for β-glucan extraction techniques having high levels of total β-glucan extraction as well as providing high concentrations of β-glucan in the oat flour.

Surprisingly, methods have now been discovered that satisfy these needs. These methods involve dry milling fractionation methods that can be conveniently practiced using known milling equipment and systems in commercial oat milling facilities.

SUMMARY OF THE INVENTION

In its method aspect, the present invention resides in dry milling fractionation methods. The methods involve processing oats to form a bran fraction and oat flour fraction, comprising the steps:

bolting (20) coarse whole heat conditioned grain oat flour (19) having a native β-glucan content to form a first pass coarse oat bran 21A having a particle size greater than about 1030 μm (being retained on a US #18 screen), a $1^{st}$ pass fine oat bran 21B having a particle size of less than 1030 μm (passing through a US #18 screen) but greater than about 520 μm (being retained on a US #34 screen) and a first pass low bran oat flour (22) having a particle size of less than about 420 μm (through a US Standard Size #40 screen);

flaking (24) each of the first pass oat bran sub-streams 21A and 21B to form flaked oat brans (25 and 25B);

bolting (26) the flaked first pass oat brans to form a first coarser major second pass β-glucan rich oat bran fraction (28) having a particle of greater than 520 μm (being retained on a US #34 screen) and a second finer minor second pass low bran oat flour (27) having a particle size of less than 520 μm (passing through a US #34 screen);

hammer milling (30) the second pass β-glucan rich oat bran fraction (28) to form a milled oat bran (31); and, bolting (32) the milled oat bran (31) to form a first coarser major third pass β-glucan rich oat bran fraction (50) having a particle of greater than about 318 μm (being retained on a US# 50) and a second finer minor third pass low bran oat flour (33) having a particle size of less than 318 μm (passing through a US #50 screen).

In its principle product aspect, the present invention provides high β-glucan content oat bran 50 having improved flavor and cookability. The oat bran is characterized by a β-glucan content of at least 7%. The oat bran has an improved flavor profile that can be expressed by syringic to ferulic ratio of at least 2.5:1. The product is partially heat processed as expressed in a Farinograph cook value ranging from about 5-20 minutes. The oat bran fraction has a β-glucan content at least twice that of the oat flour from which the bran is fractionated.

In other product aspect, the present invention provides a low bran oat flour 40. The low bran oat flour has a β-glucan content of less than 3%. The low bran oat flour has an improved flavor profile that can be expressed by syringic to ferulic ration of at least 2.5:1. The low bran oat flour product is partially heat processed as expressed in a Farinograph cook value ranging from about 5-20 minutes.

In still another product aspect, the present invention resides in whole oat flours fortified with added amounts of the present high β-glucan content oat bran to provide a high β-glucan content oat flour 80 and having improved flavor and cook characteristics.

In still another product aspect of one and the same invention, the present invention resides in ready-to-eat products high β-glucan oat based cereal 110 that find particular appeal to health conscious consumers.

In still another aspect of one and the same invention, the present invention resides in ready-to-eat low β-glucan oat based cereal products that find particular appeal to children.

DETAILED DESCRIPTION OF THE INVENTION

Figure 1:
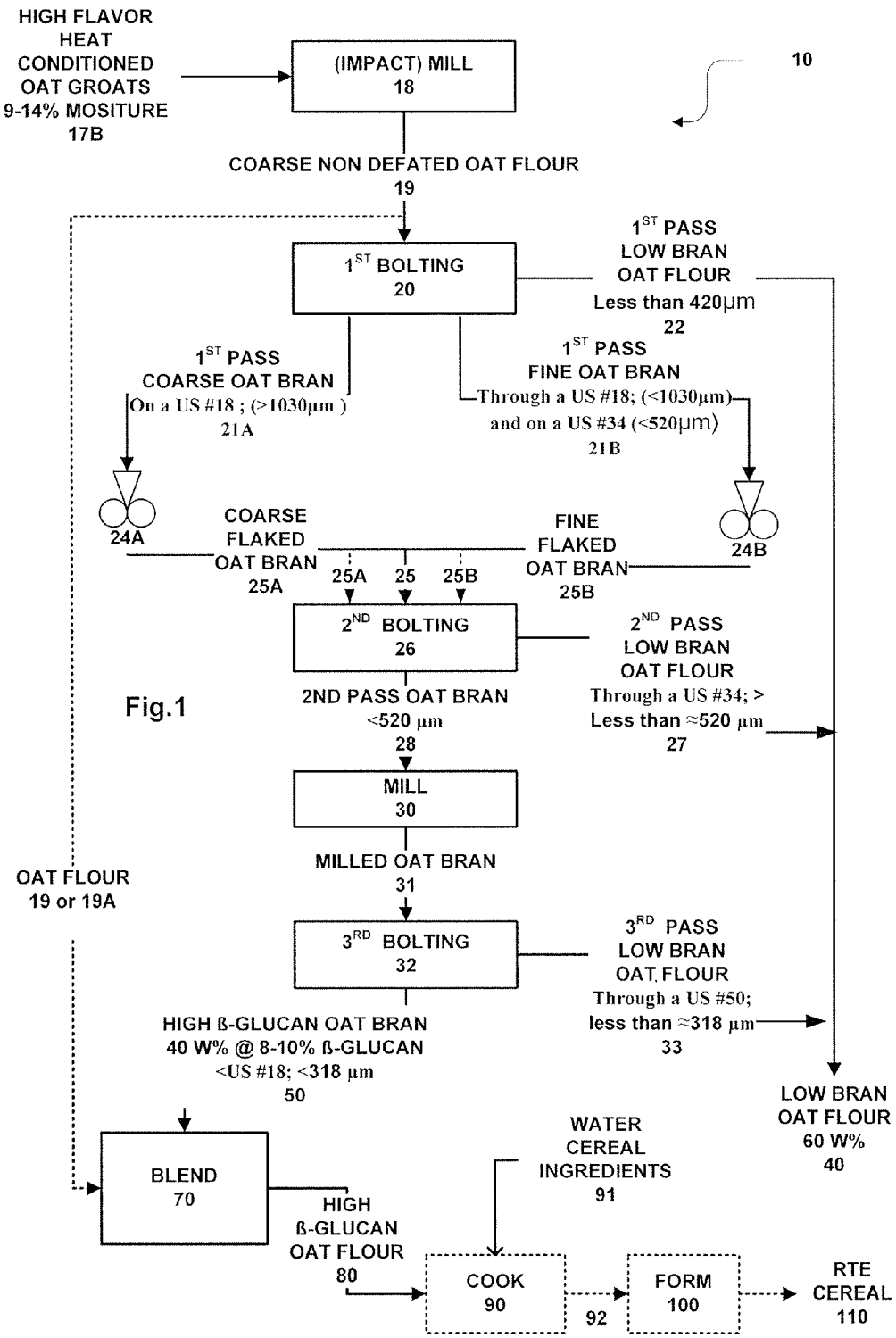
FIG. 1 is a highly schematic representation of a method for processing heat processed oat groats into high β-glucan oat bran and into a low bran oat flour in one embodiment of the present invention.

The present invention is directed towards improved processes for milling oats to provide an oat bran high in β-glucan; a β-glucan enriched whole grain oat flour comprising the enriched oat bran; and to a low bran content oat flour.

Throughout the specification and claims, percentages are by weight and temperatures in degrees Centigrade (° C.) unless otherwise indicated. Each of the US patent's and applications reference herein are hereby incorporated by reference.

Referring now to FIG. 1, there is depicted a flow diagram of a process for preparing an improved milled oat materials generally designated by reference numeral 10. To the extent possible and for clarity purposes, FIG. 1 employs comparable reference numerals to the process flow diagram of US 2005/0153044. Oats are received in bulk such as from railroad cars and dehulled to provide dehulled oats or oat groats. The oat groats generally will have an initial moisture content ranging from about 8 to 10%. The oat groats are cleaned in cleaning step to provide cleaned oat groats to remove residue such as dirt, small stones, undersized corns and residual hull fragments. The oat groats will have an initial native β-glucan content ranging from about 3-5% depending upon such factors as variety, crop years, etc. The cleaned oat groats are then heat conditioned with steam to provide cleaned conditioned to groats. The heat conditioning step is generally practiced to inactivate enzymes to provide a enzyme inactivated or conditioned oat groats. The steam injection conditioning step is designed primarily to inactivate the enzymes including lipase, lipoxigenase, peroxidase, amylase, and protease. The conditioned oat groats will have a negative peroxidase activity as measured by AAAC test method 963.27 (American Association of Cereal Chemists, 15th Ed., 1990). Conventional treatment methods, including times and temperatures, can be used to practice the heating step. Generally, the step involves heating for about 10 to 15 minutes using steam at about 5 to 20 psig (120 to 150 KPa). The steamed oat groats have a moisture content increased to about 16 to 25% by virtue of moisture absorption from the steaming exposure step.

However, in a preferred embodiment, the oat groats can be treated by the extensive heat treatment methods for flavor development and as described in my U.S. Pat. No. 5,523,109 to provide conditioned oat groats 17B characterized not only low levels of residual enzyme activity but also by improved flavor and improved cook characteristics. The improved flavor attribute can be expressed by and the oat groats 17B have a ratio of syringic acid to ferulic acid being greater than or equal to 2.5. The improved cook characteristics can be expressed by and the oat groats 17B can have a Farinograph value of about 5-20 minutes, preferably about 6 to 14 minutes.

In this particular preferred embodiment, the present methods can comprise the step of dry heating the steamed oat groats such as by indirect steam contact to 185° to 230° F. (85° to 110° C.) in an appropriate vessel such as in toaster for about 70 to 110 minutes to provide a conditioned and toasted oat groats. By virtue of the extended heat treatment, the oat groat 17B moisture content is reduced and can range from about 9 to 14%. The steamed, enzyme deactivated oat groats 17B are heated to provide improved cook characteristics that lessen the energy requirements for cooked dough development and to develop a cooked flavor in the groats. Sufficient extended heat treatment is indicated when the oat groats 177B express a Farinograph cook time value of about 5 to 20 minutes. Within this range, for those flours to be used in cooker extruders such as a twin screw extruder better results in terms of reductions in needed duration of subsequent cook times is obtained when the Farinograph cook time value ranges from about five to eight minutes, while for extended cook time cookers, better results are obtained when the Farinograph cook time ranges from about 14 to 20 minutes.

A Farinograph measurement is a standard test method by the American Association of Cereal Chemists: AACC test method 54-21. The present cook or development time is a modification of the AACC test except that 1) the oat flour herein is used in substitution for wheat flour, and 2) the start point is developed at 95° C. rather than room temperature. Generally, a Farinograph is used to measure the torque required to mix oat flour dough at heated temperature. The time needed to develop maximum torque indicates the level of energy input required to form a cohesive dough. A shorter dough development or cook time in the Farinograph is indicative of a higher level of steam pretreatment.

In certain preferred embodiments (not depicted), the dry heating or toasting step can include a first sub step of venting the steam to form steamed and vented oat groats. The venting reduces the moisture content to about 15 to 20%. Thereafter, the dry heating step can include a second sub step of dry heating the steamed and vented oat groats to form the steamed and toasted oat groats. The step can be practiced employing indirect steam or other dry heating technique. The dry heating technique can be continued to yield the finished conditioned oat groat having a moisture content of about 9 to 14%. The skilled artisan will appreciate that the process can be practiced employing multiple vessels or a single vessel (e.g., gravity fed) having multiple sections or chambers.

Dry heating as used herein means heating only in the presence of any moisture which may be inherently present in the oat groats as a result of the prior steaming step but not in the presence of any additional or added moisture nor in the presence of a humid atmosphere, i.e., less than 40% relative humidity.

The preferred finished steamed and toasted oat groats 17B result in a cooked cereal flavor in the resulting flour. The oat groats and flours prepared therefrom can be characterized syringic ferulic by a ratio of specific phenolic acids that indicate improved flavor. More specifically, the oat groats and flours prepared therefrom can have a syringic to ferulic acid content ratio that is higher in syringic acid. The ratio of syringic acid to ferulic acid can range from about 2.5:1 up to 5.5:1. In preferred embodiments, the ratio is at least 3:1. One analytical method utilized to act as a marker for this flavor development is the HPLC (high performance liquid chromatography) area ratio of specific phenolic acids of >2.5. Specifically, the numerator is HPLC area for the syringic acid peak combined, and the denominator is ferulic acid peak area determined by HPLC retention times. The numerator area corresponds to concentration and has to this point been observed to range from about 10 to 35 ppm and the denominator will range from about 4 to 7 ppm. The syringic acid peak (including its associated phenolic ester having an HPLC elution time of 0.7 minutes differential) has been observed to be positively correlated with increased heat treatment of the oat groats while the ferulic acid level remains fairly level. Thus, increased heat treatment or toasting results in greater flavor development and in a greater amount of phenolic ester and a larger ratio value.

The dry heating step will continue to gelatinize the starch, but the primary function of the heating process is to toast the oat groat to generate a distinct toasted flavor. The toasted flavor in the oat flour will impart desirable flavor to the extruded cereal products. To ensure proper toasting, the moisture content and heated temperature of the oat groats, as well as the heating time play important factors. In general, the moisture content of the oat groats entering the heating zone (after venting) should be in the range of 15 to 20%. The heating temperature of the oat groats should be in the range of 185 to 230° F. The heating time is in the range of 70 to 110 minutes or longer.

In the '109 patent the conditioned oat groats were milled directly to provide a whole oat flour having an improved flavor and desirable cooking attributes. No effort was made to fractionate the milled grain into separate bran and flour fractions.

Referring now to FIG. 1, the cleaned conditioned oat groats, especially those of enhanced flavor 17B prepared by the methods of the '109 patent, are the starting material for the present process 10. The present methods comprise the step of milling 18 the cleaned and conditioned oat groats 17, preferably the high flavor oat groats 17B, to provide coarse non-defatted whole (or, equivalently, "whole grain, i.e., containing both flour and bran) oat flour 19. For convenience of understanding relative material flows, the process flow diagram FIG. 1 assumes a starting quantity of oat groats 17B of 100 kg. and that all 100 kg is milled to form oat flour 19.

Conventional milling equipment and can be used to practice milling step 18. For example, a Buhler "X" mill (a small scale mill often used for flour and grain milling development purposes) can be used to practice this step on a bench-top or development scale. In a preferred embodiment, milling step 18 is practiced on a commercial or industrial scale such as using an impact mill or a milling roll stand, i.e., a pair of counter rotating milling rolls. The milling roll stand can be operated with the two rolls operating at differential speeds ranging from about 1:1 to about 3:1, preferably about 2:1. In this preferred variation, one roll is operated at about 60 revolutions per minute ("RPM") while the second is operated at about 30 RPM. The roles are set at a nip gap of about 15 to 45 mil or (0.015 to 0.045 inch; i.e., about 380 to about 1150 micrometers), preferably about and 25 to 35 mils (640 to about 880 micrometers). In commercial operations, in preferred foe, 4 inch (10-11 cm) diameter milling rolls can be used having various milling roll corrugations. The skilled artisan will have no difficulty in selecting useful milling roll configurations. In even more preferred form, one roll is provided with a "Dawson 25" pattern (i.e., having a Dawson pattern at 25 conjugations per inch) with a 0.25 inch axial twist (i.e., 0.25 inches of twist per 12 inch of extension). In this variation, the second milling role is provided with a "Minneapolis 19" style or 22 corrugation cuts per inch also with a 0.25 inch axial twist [A better description of milling industry standard types of milling role corrugations such as "Dawson" and "Minneapolis" can be through Creason Corrugating Co. (4110 South Creek Road, Chattanooga, Tenn. 37406 USA)].

The whole grain oat flour 19 has its native level of β-glucan typically ranging from about 2-4%. In other variations, varieties of oats having higher native levels of β-glucan can also be used and, less preferably, varieties having lower levels of β-glucan. For example, certain specialty varieties of oats are now available having up to 8% β-glucan and can be used herein. If and when commercial quantities of such oat materials are available at sensible pricing, then such starting materials of such oat varieties will be highly suitable for use in the present methods. Also, it is contemplated hereon that future varieties of oats having even higher native levels of β-glucan will be developed in the future that can be usefully processed according to the present methods to produce the various oat products of the present invention and are thus contemplated for use herein. The present invention finds particular suitability for use in connection with conventional oats especially in those crop years in which the β-glucan is undesirably deficient or low due to vagaries of growing conditions. In these off crop years, in order for finished products to have the customary and expected levels of β-glucan, then the β-glucan deficient oat flours must be fortified with oat bran with higher β-glucan concentrations in order to bring up the oat flour's β-glucan concentration. Of course, the present methods are intended to provide commercially practical improved methods for the production of such oat brans from such poor quality (in terms of low native β-glucan concentrations) starting materials.

The present methods can further comprise a first bolting or fractioning (i.e., separating into fractions based upon size) step 20 to separate the coarse oat flour 19 into a first pass oat bran fraction 21 and a first pass low bran oat flour 22. It is at this point where the present improved methods and the prior methods of the US 2005/0153044 begin to differ. In the present methods, it is important to select for practice the commercial specific embodiment described in numbered paragraph 40 of 2005/0153044 (which is replicated below). In the present bolting step 20 can be practiced by size selection such as by passing or screening the whole four through a US standard size 18 sized sieve or screen to provide a "coarse" oat bran fraction retained on the #18 screen or first pass coarse oat bran 21A having a particle size of greater than about 1030 microns (μm) (i.e., >≈1030 μm). Bolting step is further practiced to isolate a second "finer" oat bran sub-stream that passes through the #18 screen (i.e., is smaller than about 1030 μm) but is retained on a #34 screen (i.e., has a particle size of greater than about 520 μm) to provide a first pass fine oat bran sub-stream 21B. The balance is screened through a 340 screen to provide a low bran oat flour ("LBOF") 22 having a particle size of less than about 420 μm. Collectively, the first pass oat bran factions 21A and 21B will be larger both in size and amount than the LBOF 22 stream. For example, for a plant processing coarse oat flour 19 at a rate of 100 kg/hr, the oat bran fraction 21 will typically range about 52 to 58 kg/hr. Particles smaller than about 420 micron pass through the size 40 screen at a rate of about 42-48 kg that comprise the low bran (and thus low β-glucan content) oar flour 22. The first pass low bran oat flour 22 generally will have low levels of oat bran and thus low levels of β-glucan, typically less than 3% and often much less, e.g., less than 1%.

If desired, such as for commercial efficiency, the first bolting step 20 can be practiced employing one or more sub-steps (not shown). For example, the oat flour 19 can be initially passed through a first screen having larger sized openings, e.g., a US standard size No 18 screen. A coarser first pass oat bran fraction is retained upon the No 18 screen. The oat material that passes through the No 18 screen (about 1 mm or smaller) is then passed through the No. 34 sized sieve to provide a fine or finer first pass oat bran fraction and the first pass low bran oat flour 22. Thereafter, the coarser first pass oat bran fraction (that is retained upon the No 18 screen and thus is larger than about 1 mm) is combined with the finer first pass oat bran fraction to provide the first pass oat bran 21 material or sub-stream.

Of course, different milling facilities can use different milling equipment such as differently sized screens. However, in each variation a more coarse oat bran fraction is obtained that is selectively concentrated in the β-glucan constituent. Generally, the fractionation step is practiced to provide an oat bran fraction 21 having its β-glucan concentration increased on the order of about 2% above its native or starting level. Thus, a coarse whole oat flour stream or material is fractionated into an oat bran fraction 21 having about 5% or substantially all of the β-glucan constituent and a second smaller oat flour fraction 22 containing a reduced β-glucan content (typically under 2% assuming a starting concentration of about 3% in the oat flour 19) and relatively more of the starchy endosperm fraction. Of course, the particular β-glucan content in the fractions 21 and 22 will depend upon the starting concentration such factors as oat variety as well as year-to-year crop variations.

The present oat milling methods 10 can further comprise an oat bran size reducing step 24 such as a flaking step wherein the first pass oat bran fraction 21 is flaked to provide a size reduced or flaked oat bran 25. The flaking step 24 can be practiced conveniently such as by passing the first pass coarse oat bran fraction 21A through a first pair of counter rotating double roll stand or flaking rolls to practice a first sub-step 24A. In preferred form, the flaking rolls are set at a nip gap setting of up to 20 mils (0.020 inch, or, equivalently, ~500 micrometer or "μm"). In the flaking double roll stand, each roller is preferably a smooth roll. As in milling step 18, the rolls can be counter rotated at differential roll speeds ranging from about 1:1 to about 3:1 and at speeds ranging from about 20 to 100 RPM. In a preferred embodiment, one roll is operated at about 60 RPM while the second is operated at about 30 RPM to provide a differential roll speed of about 2:1. Step 24 can further involve a parallel second sub-step 24B of flaking the first pass fine oat bran 21B in a second roll mill stand to produce a fine flaked oat bran sub-stream 25B. As depicted in FIG. 1, the sub-streams 25A and 25B can be combined or merely separately fed into the next or second bolding step. Broadly, the present improved methods hereafter follow the steps and sequence as described in US 2005/0153044.

The present methods can further comprise a second bolting or fractionation step 26. The flaked oat bran 25 is separated or fractionated in the second bolting step 26 into a larger quantity or fraction of a second pass oat ban fraction 28 and a smaller quantity or fraction low bran oat flour 27. In a manner similar as described above for step 20, the second bolting step can be practiced by passing the flaked oat bran 25 through a screen or sieve such as a US Standard size No 34 screen. The larger sized oat bran 28 is retained upon the No 34 screen while the smaller sized (and amount) second pass oat flour 27 passes through the No 34 screen to form the second pass low bran oat flour 27. In commercial practice, the 55 kg/hr stream of flaked oat bran 25 is separated into a sub-stream of about 45 (42-48) kg/hr of second pass oat bran 28 and the balance, about 10 (plus or minus 3) kg/hr, of second pass low bran oat flour 27. Substantially all of the β-glucan is associated with the oat bran 28 and the second pass oat flour 27 generally will have (β-glucan levels of less than 2.5%. It will be appreciated that less oat flour is extracted or separated in the second bolting step 26 than in the first bolting step 20 since the flaked oat bran 25 is more concentrated in the bran fraction and contains less of the starchy oat flour than the coarse oat flour 19. The second pass low bran oat flour 27 is collected as a separate sub-stream and/or can be combined with the first pass low bran oat flour 22 sub stream.

The second pass oat bran 28 material generally comprises about 6% to 7% β-glucan and more preferably about 6.5% β-glucan. That is, oat bran 28 has a β-glucan concentration about twice that of starting material oat flour 19 or, otherwise expressed, has a β-glucan beneficiation ratio of at least 2.0. In more preferred embodiments, oat bran 28 has a β-glucan concentration at lest 2.3 times greater than starting material oat flour 19. For certain applications, oat bran 28 can be used as a high β-glucan content ingredient per se. In other variations, oat bran 28 is an intermediate product useful for further processing (as described immediately below) for to prepare an oat fraction even more highly concentrated in β-glucan. In certain preferred embodiments wherein the high flavor oat groats are selected to provide the starting oat flour 19, the oat bran fraction 28 also exhibits the desirable improved flavor profile that can be expressed by a syringic to ferulic ration of at least 2.5:1. Also, oat bran fraction 28 can have improved cook attributes expressed as having a Farinograph value of between 5 and 20 minutes, preferably about 6 to 14 minutes. For example, oat bran fraction 28 can be used as the principle ingredient in a hot oat bran cereal. If desired, the oat bran can be admixed with small quantities of salt, flavorings, sweeteners and/or dried fruit pieces to provide a dry mix for a hot oat bran cereal.

The second pass oat bran 28 can be fed into and the present methods can comprise a milling 30 step to provide a milled oat bran 31. It will be appreciated that milling step 30 is the third milling step that size reduces the oat particles and the second that size reduces only the oat bran. In a preferred variation, milling step 30 is practiced employing a hammer mill. A hammer mill is a common milling equipment item. While not wishing to be bound by the proposed theory, it is speculated herein that the β-glucan is bound with the bran so tightly that by breaking the all bran up such as with a hammer mill, the β-glucan constituent is released from the oat bran or at least made more available to measurement. Additionally, hammer milling the second pass oat bran 28 beats or releases more endosperm from the oat bran 28 allowing for complete separation of the starchy endosperm from the bran in the to-be-described step 32. In preferred form, conventional hammer mills are employed to practice the milling step 30. In more preferred form, the hammer mill is equipped with a #6 US standard size sieve exit screen through which the milled oat bran 31 must pass to provide a milled oat bran 31 having a particle size of ≧3 mm. Milled oat bran 31 generally comprises about 6% to 7% β-glucan.

It has been surprisingly found that the ambient humidity can affect the results of the hammer milling step 30 and the extraction efficiency of the to-be-described third bolting step 32. While not wishing again to be bound by the proposed theory, it is speculated that higher environmental humidity conditions increase the dew point. At higher dew point's, less moisture is lost from the oat bran caused by the heat generated during the hammer milling step 30. As the milled oat bran 31 is conveyed to the third bolting step 30, moisture flashes off in proportion to the dew point of conveying air. Less moisture loss results in tougher oat bran which in turn can results in less bran loss to the flour extracted and the third bolting step 30 to in turn less bran loss to the oat flour in bolting step 30 to results in increased bran extraction and thus higher concentrations of β-glucan in the bran fraction. Thus, greater extraction rates of high about 6% to 7% p-glucan oat bran can be expected under higher ambient moisture conditions due to such factors as weather, season and geographic location.

The present methods 10 can comprise a third bolting or fractionation step 32 wherein the milled oat bran 31 is fractionated to form a first minor third pass low bran oat flour 33 comprising the smaller or finer oat flour particles and a second fraction of the comprising the larger sized high β-glucan oat bran fraction 50. In preferred form, the third bolting step 32 to is practiced in a manner similar to the practice of first bolting step 20 and second bolting step 26. More specifically, in preferred form, the third bolting step 32 is practiced by a size classification of the relatively larger all bran particles from the relatively smaller third pass low bran oat flour 33. Similar equipment and techniques can be used to practice the third bolting step 32 to that practiced in the first bolting step 20 and/or the second bolting step 26. The milled oat bran 31, for example, can be pass through a finer screen than used in steps 20 or 26 screen such as a US standard size No. 50 screen or finer to separate the relatively larger high β-glucan all bran fraction 50 that is retained upon the screen allowing to pass through this green the smaller sized oat flour 33 particles. As a result, the oat flour 33 generally will have a particle size of less than 300 μm and a β-glucan of less than 3% while the oat bran 50 separated will have a particle size greater than 300 μm.

The third pass low bran oat flour 33 material or sub stream can be collected or, in preferred form, combined with the first pass low bran oat flour 22 as well as the second pass low bran oat flour 27 to form a low bran oat flour product designated by reference numeral 40. While not critical per se, the oat flour 33 extraction is effective to remove about 10 kg per 100 kg of oat flour 19 starting material or 10 kg/hour from the 45 kg per hour feed stream milled oat bran 31 to the third bolting step 32. When the third pass low bran oat flour 33 is combined with the earlier formed oat flour fractions 22 and 27, about 60 to 70 kg per 100 kg of starting oat flour of a low bran oat flour 40 is extracted, preferably about 65 kg. The balance retained on the screen from the third bolting step 32 is relatively high in β-glucan content. The β-glucan content of the high β-glucan oat bran fraction 50 can range from about 8 to 9%, and more typically about 8.5% depending upon such factors as the ambient humidity associated with location and time of year.

The low bran oat flour 40 so prepared is useful as an ingredient in the preparation of a variety of oat based consumer products especially consumer food products. The low bran oat flour 40 is particularly suited for use in connection with the preparation of cooked oat based puffed ready eat cereals. In particular, the low bran oat flour 40 is particularly suitable for use for the production of puffed oat based RTE cereals for children. Such products can be more highly puffed to lower densities relative to those obtained from whole oat flours and without the addition of diluent starches and, by virtue of the absence or low levels of the oat bran constituent, are beneficially characterized by lower levels of strong or bitter oat taste. Some consumers, especially children, are highly sensitive to certain bitter flavors associated with oat products high in oat bran. Also, in certain markets, especially European RTE cereal markets (excluding the British Isles where oat meal is commonly consumed), oat based consumer food products are unfamiliar in taste and such low oat bran low oat flavor RTE cereal products may find particular appeal. Notwithstanding the lower levels all of β-glucan in the low bran oat flour 40, the low bran oat flour 40 nonetheless provides high levels of protein.

The low bran oat flour 40 is characterized by a low level of β-glucan. The low bran oat flour 40 has a β-glucan content of less than 3%, preferably less than 2% β-glucan, and in the most preferred embodiments comprises less than 1% β-glucan. In certain preferred embodiments, the low bran oat flour 40 has a β-glucan content of no greater than 50% of the native level in the oat flour 19 and in more preferred embodiments no greater than 25% of the native β-glucan level of the oat groats 15 or oat flour 19 starting material.

The low bran oat flour 40 not only is characterized by low levels of β-glucan but also by higher flavor levels although not of the bitter notes from the bran fraction. The cleaned conditioned oat groats are provided by practicing the heat conditioned step according to the teaching '109 patent, the low bran oat flour 40 can be characterized by a syringic it to ferulic acid ratio of greater than or equal to 2.5, that is, a ratio of the HPLC (High Performance Liquid Chromatography) syringic acid peak to ferulic acid peak, of about ≧2.5 which ratio is characteristic of a toasted flavor attribute. Also, the low bran oat flour 40 can exhibit improved cooking characteristics that can be and expressed as having a Farinograph value of between 5 and 20 minutes. As result, as noted above, the low bran oat flour 40 can be used to provide an improved puffed ready eat cereal that appeals not only to those oat sensitive adult consumers but also for children. As result, the puffed ready-to-eat cereal finds particular suitability for use in the provision of an "all-family" oat based puffed ready eat cereal. While such puffed ready to-eat oat cereals can include a sugarcoating, it is an advantage of the present invention that such puffed oat based ready eat cereals require lower levels of a topical sugarcoating to offset any undesirable bitter oat flavor notes that hereto for resulted from the oat flour cereal ingredient. Moreover, for those consumers that find the flavor of oat-based ready eat cereals less familiar (such as in certain European countries where oat consumption by people is less common) such an advantage provides the opportunity to provide the nutrition and health benefits of oat based food products to these consumers in a more appealing form.

The low bran oat flour 40 by virtue of its low bran content exhibits an appealing light color and texture. Consequently, the present low bran oat flour 40 presents increased appeal as an ingredient for nonfood products especially as a high-quality ingredient for cosmetics such as skin creams or soap products comprising oat materials. Generally, the yield of LBOF is about 60 weight percent of the original oat flour material 19.

The high β-glucan oat bran product 50 of the present invention comprising about 7-11%, preferably about 8% to 9% β-glucan finds used as a high-value specialty food ingredient that can be added to a wide variety of food products to increase the β-glucan content or can be used as an ingredient in the provision of a hot cooked cereal (in like manner as described above for oat bran fraction 28). It will be appreciated that the present dry milling and extraction methods 10 of the present invention provide an economical process for the extraction and provision of β-glucan from commodity oats. At present, it is expected that this ingredient will be priced at a premium of about 300% per pound or kg compared to the price of oat groats. Generally, yields of about 40% (±5%) can be expected.

The finished oat bran 50 material of the present invention has β-glucan content concentration that is higher than the starting or native level of the oat flour 19 from which it is extracted. This improvement can be expresses as a ratio of final to initial concentrations sometimes referred to as a beneficiation ratio (% final/% initial). The present methods provide beneficiation ratios ranging from about 1.01 to about 2.75, preferably at least 1.5 (i.e., at least 150% of the native level) to about 2.25 and for best results at least 2.0 (i.e., at least 200% of the native level). Yields as high as 38% can be realized when lower beneficiation is accepted. At lower yields, oat bran materials having at much as 275% of the native level can be realized.

In one embodiment of the present invention, the high β-glucan oat bran 50 can be combined with an oat flour such as the whole grain oat flour 19 and blended in step 70 to provide a soluble fiber enriched high β-glucan oat flour 80. By blending various amounts of the high β-glucan oat bran 50 with the oat flour 19, a high β-glucan oat flour 80 can be formulated having a higher level of β-glucan than its native level, that is oat flour 80 will have a β-glucan content ranging from about 4-7%, i.e., more typical of that of oat bran rather than oat flour. The oat flour 19 and the high β-glucan oat bran 50 can be combined in any desired weight ratio ranging from about 100:1 to about 1:10, preferably firm about 100:10 to about 100:50, and for best results about 100:30. For example, in a particular execution, the oat bran 28 and/or 50 is added oat flour 19, whether or not subjected to oat flour milling step 76, to provide an enriched (in β-glucan) oat flour be in a weight ratio with oat bran 50 in a weight ratio ranging from about 1:1 to about 2:1, preferably about 4:1 to about 2:1 and for best results about 3:1 oat flour to oat bran(s) (28 and/or 50). The oat flour 19 can be a conventional whole grain oat flour. However, and in more preferred embodiments, the oat flour 19 is prepared to according to the methods of the '109 patent. By virtue of the improved flavor profile as taught in the '109 patent, and especially in those embodiments of the present invention in which the cleaned conditioned oat groats 17 are likewise prepared according to the teaching '109 patent, the high to β-glucan oat flour 80 of the present invention is characterized not only by higher levels all of β-glucan but also by improved flavor and cooked characteristics. In certain variations, the methods can include supplemental milling 76 the coarse oat flour 19 to provide a fine milled oat flour 19A in full or partial substitution for the coarse milled oat flour 19.

The high β-glucan oat flour 80 finds particular suitability for use in the provision of oat based food ingredients characterized by high levels all of desirable β-glucan soluble fiber, especially in the provision of puffed cooked cereal dough oat ready-to-eat cereal products. Such high β-glucan, high soluble fiber puffed oat based cooked cereal ready eat cereal products fine particular appeal to those consumers desiring the health the nutrition benefits associated with consumption of oat based foods.

Referring again to FIG. 1, it can be seen that the oat flour 80 can be combined with water and other cereal ingredients 91 (e.g., salt(s), sugar, starch). In preferred embodiments, the present whole grain oat flour comprises 80%> of the dough (dry weight basis). The cooked cereal dough 28 can have a moisture content of about 12 to 35%. The present methods can further comprise a cooking step 90 for forming a cooked cereal dough 92 having high levels of β-glucan (i.e., higher than 4%). The methods can additionally comprise the step of forming 100 the cooked cereal dough into a finished R-T-E cereal 110 having high levels of β-glucan (i.e., higher than 4%. For example, the cooked cereal dough can be formed into partially dried "O" shaped pellets and puffed to form improved puffed "O" shaped finished dried (5% or less moisture) RTE cereal pieces or can be formed into flakes, biscuits, squares, shreds or other common RTE cereal shapes. If desired, both the cooking, dough forming and puffing steps can be practiced in a single pieces of equipment such as in a twin screw extruder or can be practiced in two or more separate equipment operations.

In the more preferred form, such puffed oat based cooked cereal dough ready-eat-cereal products of the present invention have a density ranging from about 0.1 to about 0.35 g/cc as well as a β-glucan content higher than 4%, preferably about 4-7%. Such products, if desired, can include a topical sweetener coating.

Also, if desired, such products can be additionally fortified with supplemental soluble fiber ingredients such as insulin to provide products characterized by even higher levels all soluble fiber. The supplemental soluble fiber ingredient such as insulin can be included into the cooked cereal dough from which the puffed ready-to-eat cooked cereal dough product is prepared or can being provided, in whole or in part, in the topical sweetener or sugar coating. The high β-glucan content puffed oat ready-to eat cereal product can be in the form of and "O's" (rings or toroid), puffed spheres or other ovoids or rounded shapes, letters, figurines, geometric shapes, and combinations thereof. In still other variations, the high β-glucan oat flour 80 can be used to prepare a cooked cereal dough oat based ready eat dried cereal products in the form of flakes, shreds, biscuits, or other forms of dried cooked cereal products.

In still other variations, the dried puffed ready-to-eat cereal products of the present invention can be combined with a binder such as a concentrated sugar syrup to provide formed products such as bars. In still other variations, the high β-glucan oat flour 80 can be used as a minor ingredient in the provision of aggregates or agglomerates such as prepared by sugar panning for addition to overriding ready to eat cereal products in other consumer food products. In still other variations, the high β-glucan oat flour 80 can be used as a supplemental ingredient to provide nutrition. For example, the ingredient can be used to fortify the soluble fiber level of various bread products or to provide an oat flavored leavened and baked bread item.

Is still other variations, the high β-glucan oat bran 50 can be sold as a hot cereal for human consumption. In still other variations, the flaked oat bran 25 or oat bran 28 or 31 prepared by the present invention finds suitability for use as a hot cereal ingredient providing not only relatively high levels all of β-glucan but also is in the form convenient for the rapid preparation of 80 high oatmeal type product for human consumption. In still other variations, the flaked oat bran 25 can be combined with the oat bran 50 in various ratios.

The present preferred oat ingredients have minimal peroxidase activity and a ratio of the HPLC syringic acid peak to ferulic acid peak, of about $\geq 2.5$ which ratio is characteristic of a toasted flavor attribute.

The preferred whole grain oat flour 80 can also be characterized in part by a Farinograph cook time value ranging from about 5 to 20 minutes indicating at least partial cooking. The conditioned oat flour has a Farinograph cook or development time value of about 5 to 20 minutes indicating partial gelatinization or partial precooking. The at least partially cooked high β-glucan content oat flour 80 desirably reduces the duration of the cook step 90 to provide a cooked cereal dough.

For example, in one preferred embodiment, conventional extended cook time cereal cookers are employed to prepare the cooked cereal dough. In this embodiment, cook times can range from about 30 to 70 minutes at 200 to 230° F. (93 to 110° C.) representing a 5 to 15% reduction in cook times compared to conventional processing. Notwithstanding the reduced cook times, the oat based cooked cereal doughs 28 are characterized by the desired cooked flavor characteristic of an extended cooked cereal dough.

In another embodiment, the oat flour 80 is combined with minor amounts of the other R-T-E cereal ingredients and water and cooked in a short time cooker extruder, whether a single screw or twin screw extruder, for about 0.5 to eight minutes and mechanically worked to form the cooked cereal dough 28. The dough can optionally include a variety of starches or other farinaceous materials. In one variation of this embodiment, the cooked cereal dough 28 is similarly processed as described above to produce either an oat flaked product or a puffed oat product, including a toasted puffed oat product. The cooked dough can be fed to a pellet former or the cooker extruder can be equipped with a pellet forming die head to form pellets which are fed directly to the pellet dryer.

In another variation, the cooked cereal dough 28 is extruded under conditions of temperature and pressure and through appropriately shaped and sized dies so as to cause an immediate expansion or puffing of the cooked cereal dough upon extruding to ambient conditions or "directly expanded." The directly expanded puffed oat cooked cereal dough is then face cut to form individual pieces 49. The puffed pieces can be any suitable size and shape such as letters or as ring shaped pieces. The individual puffed cereal pieces 49 can optionally be toasted to impart a desirable further developed toasted oat flavor to the puffed pieces 48 whether by radiant heating, hot air and/or high intensity microwave heating. It is a surprising advantage that the present oat flours can be used to produce by direct expansion high oat flour puffed cooked cereal dough pieces 49 having a high toasted grain flavor especially at high oat flour concentration (i.e., 50-95% oat flour, dry weight basis, preferably about 80-95%). Thereafter, the oat puffed pieces or flakes, whether dried or toasted to 2 to 6% moisture, can be directly packaged 56 for sale to consumers.

It has been previously known that oat material containing cooked cereal doughs can be directly expanded. However, the doughs in prior known methods suffered from one or more deficiencies including using oat flour ingredients that are defatted, or high levels of starch, or lack of cooked grain flavor, or had an undesirable texture due to overworking the cereal dough in the cooker extruder.

In another variation, the oat pieces, whether puffed 45 or flaked 47 and/or toasted, can be presweetened by topically adding a sugar syrup sweetener composition 42. In this embodiment, the cereal pieces or cereal base, (45, 47) can be charged to an enrober 48 and the sugar syrup 42 heated in heater 46 is topically applied thereto. The enrobing tumbling action is continued for a few minutes to evenly coat the cereal base (45, 47). If desired, various particulates such as nut pieces, fruit bit pieces, bran, or other topical additives (not shown) can be added to the enrober 48. A vitamin solution 44 optionally can also be added to the cereal base such as by adding to enrober 48 such as by in line admixing with the heated sugar syrup 42 or by separately spraying in the enrober 48. The coated cereal base 49 whether puffed, flaked, shredded, biscuit, shredded biscuit, cut dough sheet pieces, or other forms is then dried in dryer 50 to a final moisture content of about 2 to 5% to remove the added moisture associated with the sugar syrup 44 to form a presweetened finished R-T-E cereal 53. The finished cereal 53 is then conventionally packaged 56 for distribution and sale to customers.

The oat flour development time (or "Cook Times") values are measured using the following equipment and procedures. A dough made of oat flour and water is developed and cooked at 95° C. in a Brabender Do-corder (Brabender Do-corder type PL-V340 or equivalent equipped with a type 2-16-000 mixer/measuring head blade speed ratio/drive-to-driven: 3.2) with sigma type blades (type SB). The Do-corder is colloquially referred to by cereal chemists as a Farinograph. The changes in the oat dough rheological properties that occur during the analysis reflect the relative energy required to form a cohesive dough with the particular oat flour sample recorded on the Do-corder chart provide a functionality finger-print.

Cooking Characteristics measurement—Farinograph: A 60 gram oat flour sample is transferred to the measuring head/mixing bowl. The bowl temperature is 95° C. and the two paddles inside the bowl are rotating, with the test speed set at 100 rpm. A block, with a port for the addition of water, is placed in the opening of the mixing bowl to prevent the evaporative loss of the moisture in the flour. The chart pen recording the resistance on the rotating paddles as a function of test time is set to the baseline (0 Consistency Units). The flour is given 150 seconds to heat. At the end of the 150 seconds, 25 milliliters of water is added through the port in the mixing bowl block. As an oat dough begins to form, the chart pen raises off the baseline to a height of 400 to 600 Consistency Units. An initial mixing peak viscosity is obtained within one minute of the addition of the water. After reaching a peak, the viscosity gradually declines for the next three to 15 minutes and reaches a minimum of 250 to 350 Consistency Units (The Trough Viscosity). At this point the dough viscosity begins to increase. At eight to 25 minutes into the analysis, the viscosity will peak at 380 to 420 Consistency Units and begin to decline. The test is concluded at this point. The Farinograph plot from the chart recorder will show two peaks. The first peak is the mixing peak and the second peak is the development peak. The Cook Time or development time as used herein is defined as the time point at which the increasing dough consistency portion of the development peak first reaches the dough consistency plateau value, or more simplistically, when the second viscosity increase ceases. The cook time decreases with increased degree of pretreatment. (Less than 15 minutes, higher level of pretreatment; 15 to 22 minutes, moderate level of pretreatment; greater than 22 minutes, low level of pretreatment).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method to form an oat bran fraction and oat flour fraction, comprising the steps of:
    bolting coarse whole heat conditioned grain oat flour having a native β-glucan content to form a first pass coarse oat bran having a particle size greater than about 1030 μm, a first pass fine oat bran having a particle size of less than 1030 μm but greater than about 520 μm and a first pass oat flour having a particle size of less than about 420 μm;
    flaking the first pass coarse oat bran and the first pass fine oat bran to form first and second flaked oat brans, and combining the first and second flaked oat brans to form a flaked first pass oat bran;
    bolting the flaked first pass oat bran to form a second pass β-glucan rich oat bran fraction having a particle size of greater than 520 μm and a second pass oat flour having a particle size of less than 520 μm;
    hammer milling the second pass β-glucan rich oat bran fraction to form a milled oat bran; and,
    bolting the milled oat bran to form a third pass β-glucan rich oat bran fraction having a particle size of greater than 300 μm and a third pass oat flour having a particle size of less than 300 μm.

2. The method of claim 1 wherein the third pass β-glucan rich oat bran fraction has a β-glucan concentration at least 150% of a native level of the coarse whole heat conditioned grain oat flour.

3. The method of claim 2 additionally comprising the step of:
    combining at least a portion of the first pass oat flour, the second pass oat flour and the third pass oat flour to form a combined low bran oat flour having a β-glucan content of no more than 50% of a native level of the coarse whole heat conditioned grain oat flour.

4. The method of claim 2 wherein the native level of the coarse whole heat conditioned grain oat flour ranges from about 3-4% and wherein the third pass β-glucan rich oat bran fraction has a β-glucan content of between 7 and 9%.

5. The method of claim 4 wherein the flaking step is practiced employing a milling counter rotating double roll stand.

6. The method of claim 2 additionally comprising the steps of:
    exposing oat groats having a native level of peroxidase enzyme activity to steam for sufficient time to deactivate the peroxidase enzyme activity to provide steamed oat groats having a moisture content of about 16 to 25%;
    dry heating the steamed oat groats at about 85 to 110° C. for about 70 to 110 minutes to provide steamed and toasted oat groats having a moisture content of about 9 to 14%; and
    milling the steamed and toasted oat groats to form the coarse whole heat conditioned grain oat flour.

7. The method of claim 6 wherein the steamed and toasted oat groats have a Farinograph value of about 5 to 20 minutes.

8. The method of claim 7 wherein the steamed and toasted oat groats have a ratio of High Performance Liquid Chromatography syringic acid peak to ferulic acid peak ranging from about 2.5 and greater.

9. The method of claim 6, wherein the dry heating step comprises the sub steps of:
    1) venting the steamed oat groats having a moisture content of 16% to 25% to form steamed and vented oat groats having a moisture content of 15 to 20%; and,
    2) dry heating the steamed and vented oat groats at about 85 to 110° C. for about 70 to 110 minutes to provide the steamed and toasted oat groats having a moisture content of about 9 to 14%; wherein in the steam exposing step, the steam has a pressure of about 5 to 15 psig.

10. The method of claim 4 additionally comprising the step of:
    combining a portion of the coarse whole heat conditioned grain oat flour with the third pass β-glucan rich oat bran fraction in a weight ratio ranging from about 100:1 to about 1:10 to form a β-glucan rich oat flour.

11. The method of claim 10 additionally comprising the steps of:

combining the β-glucan rich oat flour with water, salt and sugar and starch to form an oat flour cereal blend;

cooking the oat flour cereal blend to form a β-glucan rich oat cooked cereal dough; and forming the β-glucan rich oat cooked cereal dough into a finished whole oat R-T-E cereal.

12. The method of claim 11 wherein the forming step includes:

puffing quantities of the β-glucan rich oat cooked cereal dough to form puffed whole oat pieces.

13. The method of claim of claim 1 additionally comprising the step of:

collecting the first pass oat flour.

14. The method of claim 13 additionally comprising the step of:

collecting the second pass oat flour.

15. The method of claim 1 comprising the steps of:

collecting at least a portion of the first pass oat flour, second pass oat flour, and third pass oat flour to produce a combined low bran oat flour having a β-glucan content of no more than 50% of a native level of the coarse whole heat conditioned grain oat flour;

cooking the combined low bran oat flour to form a cooked low bran oat cereal dough; and, forming the cooked low bran oat cereal dough into finished R-T-E cereal pieces.

16. The method of claim 11 wherein the forming step additionally comprises the sub steps of:

forming the β-glucan rich oat cooked cereal dough into pellets;

flaking the pellets to form oat flakes having a moisture content of about 12 to 18%; and, toasting the flakes to form toasted oat flakes.

17. The method of claim 11 wherein the step of cooking is continued for about 0.5-8 minutes in a single or twin screw cooker extruder such that the β-glucan rich oat cooked cereal dough has a moisture content of about 12 to 35%.

18. The method of claim 16 wherein the step of cooking is continued for about 0.5-8 minutes in a single or twin screw cooker extruder such that the β-glucan rich oat cooked cereal dough has a moisture content of about 12 to 35%.

19. The method of claim 17 wherein the cooking and forming steps are practiced in a twin screw extruder and comprise the sub step of directly expanding the β-glucan rich oat cooked cereal dough to form puffed R-T-E cereal pieces.

20. The method of claim 19 wherein the puffed R-T-E cereal pieces are ring shaped.

21. The method of claim 20, further comprising the step of drying the puffed R-T-E cereal pieces to a moisture content of about 2 to 6%.

22. The method of claim 12 wherein the cooking step is continued for about 30 to 70 minutes at 93 to 110° C. to form the β-glucan rich oat cooked cereal dough having a moisture content of about 12 to 35%.

23. The method of claim 22 wherein the step of puffing the β-glucan rich oat cooked cereal dough further comprising gun puffing the β-glucan rich oat cooked cereal dough to form the puffed whole oat R-T-E cereal pieces.

24. The method of claim 23 further comprising the step of toasting the puffed whole oat R-T-E cereal pieces.

* * * * *